Nov. 24, 1936. N. TESTI Re. 20,185
SAFETY RAZOR AND BLADE
Original Filed July 14, 1934 2 Sheets-Sheet 1
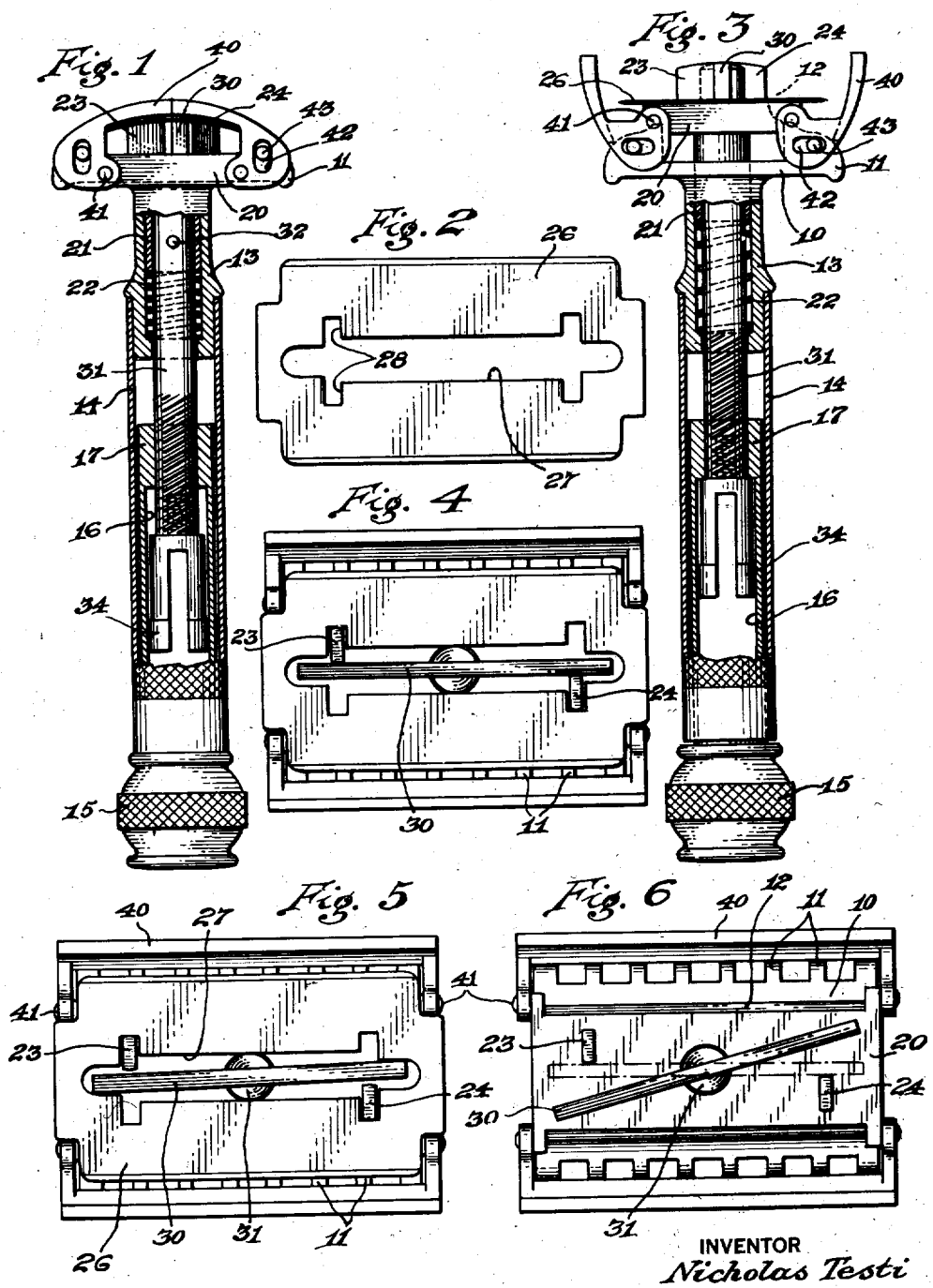
INVENTOR
Nicholas Testi
BY
ATTORNEY

SAFETY RAZOR AND BLADE

Original Filed July 14, 1934 2 Sheets-Sheet 2

INVENTOR
Nicholas Testi
BY
ATTORNEY

Reissued Nov. 24, 1936

Re. 20,185

UNITED STATES PATENT OFFICE 20,185

SAFETY RAZOR AND BLADE

Nicholas Testi, Boston, Mass., assignor to Gillette Safety Razor Company, Boston, Mass., a corporation of Delaware Original No. 2,004,086, dated June 4, 1935, Serial No. 735,180, July 14, 1934. Application for reissue May 21, 1936, Serial No. 81,134

22 Claims. (Cl. 30—61)

This invention relates to safety razors of the type in which a thin flexible blade is clamped in position for shaving between two blade-clamping members, such as a cap and guard. The invention includes within its scope a novel safety razor blade herein shown as adapted particularly for use in connection with the novel safety razor of my invention.

It will be understood that in using safety razors of this general type the satisfaction of the user depends in a large measure upon the accuracy with which the blade is located in the razor and the accuracy of its edge exposure. In locating the blade extremely fine measurements are involved and it is good practice to restrict the allowable variation or tolerance in edge exposure within a range of 0.004″. If the edge exposure of the blade is greater than is permitted by this allowance the safety razor becomes dangerous and the user is likely to cut himself. On the other hand, if the blade exposure is less than this allowance unsatisfactory shaving and pulling results. Manufacturing conditions made it difficult heretofore to hold the tolerances effecting blade exposure within the desired limits. The principal object of the present invention is to improve these conditions by rendering the operation of locating the blade in the razor more accurate and, in general, I attain the desired results by employing for this purpose cooperating, sharply defined surfaces or edges in the razor and in the blade which may be produced and located with a high degree of accuracy. In accomplishing this result I take advantage of the fact that it is easier under manufacturing conditions to shape and locate definite engaging edges of relatively small dimensions than it is to produce more extensive engaging edge contours of high accuracy. For example, a blade may be accurately located by providing it with short spaced engaging edges or shoulders and bringing such edges into abutting relation with corresponding stop lugs, since other portions of the blade may then be shaped for clearance and have no effect in positioning the blade. Thus, I overcome inaccuracies due to the necessity of allowing clearance for fit in a blade and to compensate for shrinkage in the tempering operation.

With respect to the razor itself, I contemplate cap and guard members arranged for opening or closing movement and mechanism for effecting such operation which is arranged to act through the blade itself as one link in the train and insure proper positioning of the blade before the closing of the razor. In this way I insure correct positioning of the blade before closing and entirely relieve the user of necessity for exercising any skill in locating his blade. The razor of my invention is so constructed as to insure that if the blade is presented at all to the razor it will be automatically located with the greatest possible accuracy through the medium of the most advantageous gauging surfaces, and without requiring any attention whatever on the part of the operator beyond the usual manipulations for opening or closing the razor. Indeed, I go one step further than this and insure that the razor cannot be closed at all unless the user has properly presented the blade to it. This is accomplished by including the blade itself as one element of the train of mechanism used to effect the clamping or closing movement of the razor. With this object in view an important feature of my invention consists in cooperating blade-clamping members connected for opening and closing movement and operating mechanism therefor including an element movable to a position in which closing is obstructed except when restrained from moving into such position by engagement of an apertured blade in the razor.

In one embodiment of my invention I provide an angularly movable blade-positioning bar which is moved in the razor closing operation to swing the blade and cause its gauging edges to engage suitably located blade stops in the razor. When this operation is effected the bar is locked in position and the closing mechanism is effective to carry out the closing operation. If, on the other hand, no blade is presented to the razor the blade-locating bar swings into a position to obstruct the subsequent closing movement of the cap.

These and other features of the invention will be best understood and appreciated from the following description of a preferred embodiment thereof selected for purposes of illustration and shown in the accompanying drawings, in which,—

Fig. 1 is a view of the razor in end elevation, partly in section, showing the cap sections in closed position;

Fig. 2 is a plan view of one form of blade which may be used with the razor;

Fig. 3 is a view of the razor in end elevation, partly in section, showing the cap sections in open position.

Fig. 4 is a plan view showing the razor in open position with a blade in position therein;

Fig. 5 is a plan view similar to Fig. 4 but showing the blade-positioning bar in a different position;

Fig. 6 is a similar view of the razor, shown with the blade removed;

Figure 7:
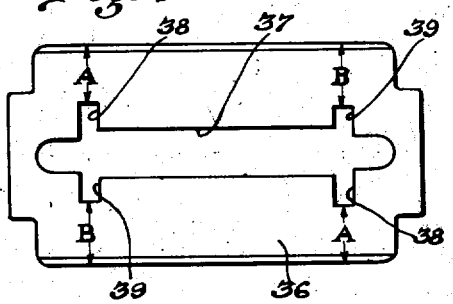
Fig. 7 is a plan view of an alternative form of blade adapted to give variable exposure.

The guard member of the illustrated razor is in the form of an elongated bar 10 having the usual guard teeth 11 formed in its longitudinal edges and provided with a deep longitudinal channel forming spaced fulcrum shoulders 12 over which the blade is flexed, as will be presently explained. A tubular stem 13 is formed integral with the guard plate 10 and extends downwardly therefrom, being externally shouldered to receive the barrel of the handle and having an inwardly extending flange at its lower end which forms the bottom of a cylindrical pocket. The lower end of the handle barrel is closed by a knurled head 15 having an upwardly extending tubular shank 16 which fits within the barrel 14 and is provided at its inner end with an internally threaded cylindrical head or nut 17.

The razor is provided with a blade-supporting or carrying plate 20 which is mounted in the channel of the guard plate 10 for up and down movement. The plate 20 is provided with a downwardly extending tubular stem 21 which fits loosely inside the stem 13 of the handle. A compression spring 22 is located in the pocket of the stem 13 and this bears against the lower end of the stem 21 and tends at all times to lift the plate 20 to the limit of its upward movement, as indicated in Fig. 3. The blade-supporting or carrying plate 20 is also provided on its upper face with a pair of spaced stop lugs 23 and 24, one located at either side of the longitudinal axis of the plate and in diametrically opposite relation, being equally and oppositely offset from the center line of the plate.

An elongated blade-positioning bar 30 is arranged for limited angular movement across the face of the plate 20 and about an axis disposed centrally thereof. The blade-positioning bar 30 is fast upon the upper end of a spindle 31 which extends telescopically downwardly within the tubular stem 21 of the plate 20 and the stem 13 of the handle. The spindle 31 is provided just below the carrying plate 20 with a short transverse pin 32 which extends outwardly into a short circumferential slot 33 formed in the wall of the stem 21. The stop lugs 23 and 24 act to limit the swinging movement of the blade-positioning bar 30 in a clockwise direction while the pin 32 and the slot 33 limit the swinging movement of the bar in the opposite direction and thus control the angular displacement which may be imparted to the bar 30. A friction head 34 is connected to the lower end of the spindle 31 by a threaded stem shown in dotted lines in Figs. 1 and 3 and the head 34 is so proportioned that it bears frictionally at all times against the inner wall of the tubular shank 16. Accordingly, rotation of the knurled head 15 tends frictionally to rotate the head 34 and the spindle 31 connected thereto when the latter is free to turn. When turning of the spindle 31 is arrested it is moved longitudinally in the handle by the cooperation of the threaded end of the spindle 31 with the internally threaded head or nut 17 of the tubular stem 16 and the bar 30 moves downwardly forcing the plate 20 ahead of it.

The cap herein shown comprises a pair of similar cap sections 40, each section being provided at both of its ends with a wide arm or web by which it is pivotally connected through pivot pins 41, to the opposite ends of the blade-supporting and lifting plate 20. Each arm of the cap section is also provided with a cam slot 42 into which projects a cam pin 43 set in the end faces of the guard 10. The pins 41 and 43 are offset transversely with respect to each other, the pivot pins 41 being located nearer together than the cam pins 43 with the result that when the cam plate 20 is elevated from the closed position shown in Fig. 1 the cam pins 43 first travel the length of the cam slot 42 and then, when they are brought up against the bottom end of these slots, further upward movement of the blade-supporting and carrying plate 20 has the effect of swinging the cap sections 40 rapidly and outwardly into their open position as shown in Fig. 3. Similarly, when the plate 20 is lowered, the cap sections 40 are swung inwardly toward each other and toward their closed position.

In Fig. 2 is shown one form of blade adapted for use with the safety razor above described. This blade 26 is double-edged and provided with an elongated internal aperture 27, this being herein shown as somewhat longer and decidedly wider than the blade-locating bar 30 already referred to. The aperture of the blade 26 is provided with transverse enlargements 28 at points in its length corresponding to the stop lugs 23 and 24 of the blade-supporting plate 20. These enlargements 28 supply at their outer ends blade-locating or engaging shoulders which have a definite relation to the cutting edges of the blade and which are relied upon, and only these, for accurately positioning the blade in the razor with the proper degree of edge exposure for shaving. The outer or end faces of the stop lugs 23 and 24 are placed in the razor with equal accuracy so that the complete locating of the blade is brought about merely by placing the blade in the razor with the stop lugs and the bar 30 in the aperture 27 and then turning or rotating the bar 30 to swing the blade about its central axis until the stop lugs are firmly seated against the gauging end edges of the openings 28.

In the blade shown in Fig. 2 the aperture 27 and the openings 28 are symmetrical in shape but if it is desired to secure a blade in position for a variable edge exposure, the openings are nonsymmetrically shaped. Such a blade 36 is shown in Fig. 7 being provided with an internal aperture 37 and transverse openings 38 and 39. The outer or engaging face of the openings 38 is located at a distance A from the cutting edge of the blade while the openings 39 are located a longer distance B from the cutting edge of the blade. It follows that when this blade 36 is located in the safety razor, as shown for example in Fig. 8, the cutting edge has a lesser exposure at the end and on that side of the blade opposite the openings 38, this exposure increasing progressively toward the other end of the blade. On the other hand, if an equal and uniform edge exposure is desired the blade 36 may be reversed face for face so that it becomes located in the razor by the engagement of the stop lug 23 or 24 with the shorter opening 39 and the blade is thus maintained in position parallel to the longitudinal axis of the guard.

The razor is shown in Fig. 3 in its open position and it may be assumed that the blade 26 has been placed upon the blade supporting and lifting plate 20 with the blade locating bar 30 and the stop lugs 23 and 24 in its aperture 27. if the user now turns the knurled head 15 in a counter-clockwise direction as seen from above, the spindle 31 and the blade-locating bar 30 carried thereby are also swung in a counter-clockwise direction. The bar 30 engages the edge of the aperture of the blade and moves it angularly until the blade-locating shoulders of the openings 28 are fully seated against the outer gauging faces of the stop lugs 23 and 24. Further angular movement of the blade-locating bar 30 is at once arrested by the blade itself; that is, having first properly located the blade by its angular movement, the bar 30 is now locked in that position by its engagement with the walls of the internal aperture 27. Further rotation of the knurled head 15 by the user, however, is effective to turn the stem 16 with its threaded head 17 and the latter acts as a nut to screw downwardly the spindle 31. This continues until the blade supporting and lifting plate 20 is fully seated in the channel of the guard plate 10 and the fulcrum shoulders 12 are thus made effective to support the blade. In the downward movement of the plate 20 the cap sections 40 are swung inwardly towards their closed position and when this has been reached the cam slots 42 assume substantially vertical position, as shown in Fig. 1, permitting further clamping movement of the closed cap sections until the blade 26 is fully flexed and clamped in its shaving position.

Figure 10:
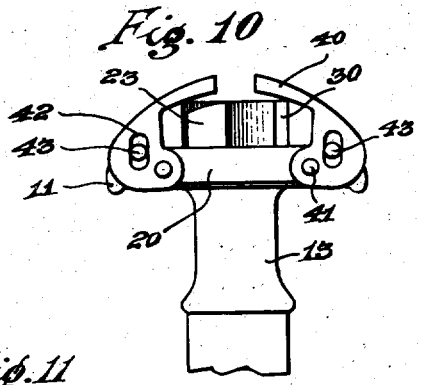
Fig. 10 is a fragmentary view of the razor in end elevation, showing the blade positioning bar displaced to prevent closing of the cap sections.
Figure 11:
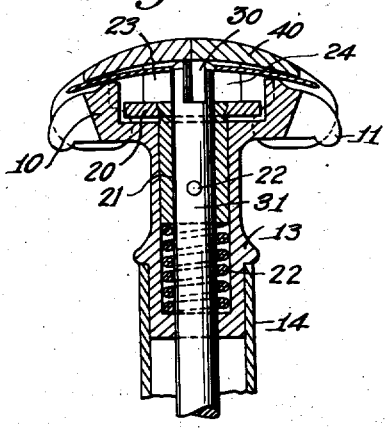
Fig. 11 is a view in end elevation, partly in section, showing the razor in closed condition.

If the user now desires to open the razor to remove or replace the blade he has only to rotate the knurled head 15 in a clockwise direction. The steps above described now take place in inverse order. The rotation of the threaded head 17 acts to screw the spindle 31 upwardly, lifting the blade-supporting plate 20 and swinging the cap sections 40 outwardly toward their open position. In this movement also the blade-locating bar 30 is displaced angularly until it engages the inner faces of the stop lugs 23 and 24 where it is arrested. When the cap sections are fully opened the condition of the razor is as shown in Fig. 3, and the blade 26 may be removed from the face of the blade-supporting plate. If the attempt is made to close the razor without any blade upon the plate 20 the blade-positioning bar 30 is swung by the turning of the knurled head 15 into some such position as that shown in Fig. 6 in which it interferes with the closing of the cap sections 40. This condition of affairs is suggested in Fig. 10 in which it will be seen that the opposite ends of the bar 30 strike the inner faces of the cap sections 40 and prevent them from fully closing.

Figure 8:
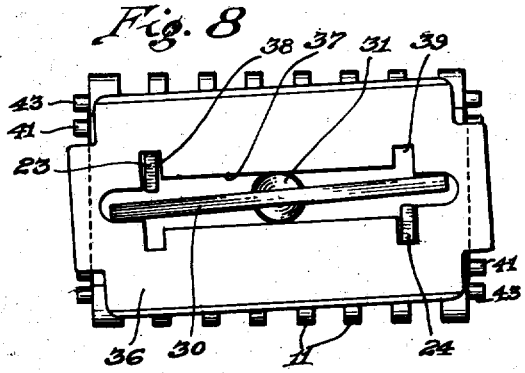
Fig. 8 is a plan view showing the blade of Fig. 7 in position upon the guard member of the razor.
Figure 9:
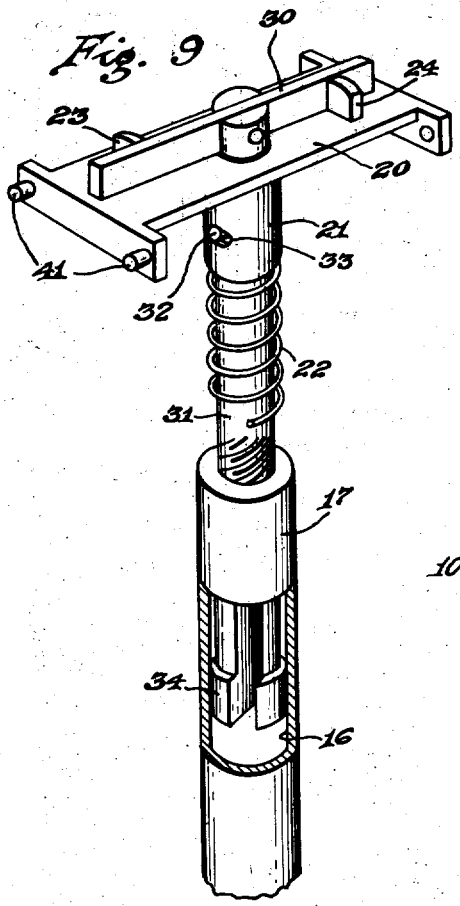
Fig. 9 is a view in perspective of the blade-supporting plate and associated mechanism.

In comparing the two blades of Figs. 2 and 7 it will be understood that in the blade 26 of Fig. 2 the gauging edges of both ends of the transverse enlargements are so located in the blade as to position it in the razor with its major axis centrally located in the razor and equally spaced between the critical edges of the closed cap sections. In the blade 36 of Fig. 7 the gauging edges of the transverse enlargements 39 are located in the manner above described, but the gauging edges of the enlargements 38 are so located as to position the blade 36 at a slight angle to the center line of the blade, as shown in Fig. 8. The user thus has the choice of placing the blade 36 with one face up, rendering the edges of the enlargements 38 effective for an oblique position, or placing the blade 36 with the other face up, rendering the edges of the enlargements 39 effective for a parallel position of the blade.

Having thus described my invention what I claim as new and desire to secure by Letters Patent is:—

1. A safety razor comprising a blade, cooperating blade-clamping members connected for closing and opening movement, and an element movable to prevent closing movement arranged to be rendered inoperative for this purpose by the blade itself.

2. A safety razor comprising an apertured blade, cooperating blade-clamping members connected for closing and opening movement, and operating mechanism therefor including an element movable to a position obstructing closing except when restrained by engagement with the aperture of the blade in the razor.

3. A safety razor having movable cap sections for flexing and clamping a blade in shaving position, and an operating train of mechanism for forcibly closing said sections including the blade as an element thereof.

4. A safety razor having movable cap sections for clamping a blade in shaving position, and an element movable to prevent clamping action of said cap sections arranged to be rendered inoperative for this purpose by the blade itself.

5. A safety razor comprising a blade having unsharpened internal gauging edges, cooperating blade-clamping members connected for opening and closing movement, blade-locating stops in the razor, and mechanism for closing said blade-clamping members operating to cause the blade to move its gauging edges to engage with said blade stops before said mechanism becomes effective to close the clamping members.

6. A safety razor comprising an apertured blade having internal gauging edges, cooperating blade-clamping members connected for opening and closing movement, spaced blade stops in the razor, and mechanism for closing said blade-clamping members including a blade-locating bar arranged to enter the aperture of the blade and to cause the gauging edges of the latter to engage with said blade stops before closing takes place.

7. A safety razor comprising a blade with an elongated aperture therein having defined gauging edges adjacent to each end, cooperating blade-clamping members connected for opening and closing movement, a blade-positioning bar movable angularly in the blade aperture and tending to cause the gauging edges of the blade to be advanced, and mechanism for closing the blade-clamping members controlled in its operation by said bar.

8. A safety razor comprising a guard member having a blade-shaping shoulder, a blade-carrying plate mounted on said guard member for vertical movement relatively thereto, cap sections carried by said plate, and an angularly movable blade-positioning bar movable vertically with said plate.

9. A safety razor comprising a guard member, a blade-carrying plate movable toward and from said member, cap sections movably connected to said plate, a blade-positioning bar movable with said plate, and mechanism for opening or closing the cap sections having an operative connection with said bar in all positions thereof.

10. A safety razor having a channeled guard plate, a blade-carrying plate movable up and down in the channel of the plate, cap sections operated by said plate, and an oscillating blade-locating bar movable with said plate.

11. A safety razor having a channeled guard plate, a blade-carrying plate movable up and down in the channel of the plate, cap sections operated by said plate, and an oscillating blade-locking bar movable with said plate, and blade-stop lugs on said plate for limiting the swing of said blade-locking bar in one direction.

12. A safety razor having cap and guard members, a blade-carrying plate movably mounted in the razor, an oscillatory blade-positioning bar arranged for limited movement on said plate, spring means binding at all times to elevate said plate, and mechanism acting positively to lower said plate when the blade-positioning bar is held against movement.

13. A safety razor having cap and guard members, a blade carrying plate having stops for holding a blade thereon against movement in one direction, an oscillatory blade-positioning bar on said plate, and mechanism acting to lower said plate when the blade-positioning bar is held against movement by a blade which engages it and said stops.

14. A safety razor having blade-clamping mechanism, including a threaded stem, an oscillatory blade-locating bar thereon, and an operating member including a nut arranged to screw down the clamping mechanism when turned by the user and when said blade-locating bar is held against turning by a blade in the razor.

15. A safety razor having a guard member, a cap member movably connected thereto, a blade stop, and mechanism for forcibly closing the cap member upon the guard to flex a perforated blade therebetween, including a blade-positioning bar arranged for transverse movement until arrested by engagement between the blade and said blade stop.

16. A safety razor having cooperating cap and guard members, a handle, a blade stop, and mechanism operated from the handle for forcibly closing said members upon an interposed perforated blade, including a blade-positioning member extending into the perforations of the blade and arranged for movement upon the guard member until arrested by engagement of the blade with its blade stop.

17. A safety razor having cap and guard members, a blade having a blade-locating shoulder, a blade stop in the razor, and means acting first to move the blade angularly to engage its shoulder against said stop and then to clamp the blade between the cap and guard members while so held.

18. A safety razor comprising cap and guard members, a handle, clamping means in the handle including two parts connected for clamping movement in response to relative rotary movement, and a blade shaped to hold one part at rest while the other is free to turn.

19. A safety razor comprising blade flexing members, and clamping means therefor including two parts connected for longitudinal movement in response to relative rotation, and a blade shaped to hold one of said parts at rest in the razor.

20. A safety razor comprising blade flexing members, and clamping means therefor including a blade-engaging part and an operating part connected for longitudinal movement in response to relative rotation, a blade rotatable with the blade-engaging part, and a stop in the razor for limiting the turning movement of the blade.

21. A safety razor comprising blade flexing members, and clamping means therefor including a freely rotatable operating device comprising two parts connected for lengthwise contraction in response to relative rotation, a blade connected to one of said members and having a shoulder, and a blade stop in the razor arranged to engage the shoulder of the blade and arrest the rotation of the blade in shaving position, thereby holding said part while the user continues to turn the other part and so clamp the blade between the flexing members.

22. A safety razor having cap and guard members, a train of mechanism for moving said members into blade-engaging position, and a blade mounted for rotary movement in the razor and included in said train.

NICHOLAS TESTI.